US010093378B2

(12) United States Patent
Kato

(10) Patent No.: US 10,093,378 B2
(45) Date of Patent: Oct. 9, 2018

(54) SIDE MIRROR FOR STRADDLE VEHICLE

(71) Applicant: KAWASAKI JUKOGYO KABUSHIKI KAISHA, Kobe-shi, Hyogo (JP)

(72) Inventor: Hideyuki Kato, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 116 days.

(21) Appl. No.: 14/651,209

(22) PCT Filed: Jul. 19, 2013

(86) PCT No.: PCT/JP2013/004422

§ 371 (c)(1),
(2) Date: Jun. 10, 2015

(87) PCT Pub. No.: WO2014/091640

PCT Pub. Date: Jun. 19, 2014

(65) Prior Publication Data

US 2015/0307148 A1 Oct. 29, 2015

(30) Foreign Application Priority Data

Dec. 14, 2012 (JP) ................................ 2012-273346

(51) Int. Cl.
*G02B 5/08* (2006.01)
*B62J 29/00* (2006.01)

(52) U.S. Cl.
CPC ................ *B62J 29/00* (2013.01); *G02B 5/08* (2013.01)

(58) Field of Classification Search
CPC ... B62J 29/00; B60R 1/06; B60R 1/02; B60R 1/066; B60R 1/064; B60R 1/0607;
(Continued)

(56) References Cited

U.S. PATENT DOCUMENTS 4,759,620 A 7/1988 Sakuma et al.
6,206,529 B1 * 3/2001 Kato ......................... B60R 1/06 359/841

(Continued)

FOREIGN PATENT DOCUMENTS

CN 2931210 Y 8/2007
CN 202294520 U 7/2012

(Continued)

OTHER PUBLICATIONS

State Intellectual Property Office of the People's Republic of China, Office Action and Search Report Issued in Application No. 201380063822.8, dated Sep. 26, 2016, 8 pages.

(Continued)

*Primary Examiner* — Stephone B Allen
*Assistant Examiner* — Jyotsna Dabbi
(74) *Attorney, Agent, or Firm* — Alleman Hall Creasman & Tuttle LLP

(57) ABSTRACT

A side mirror for a straddle vehicle includes: a mirror stay including a base end portion attached to a vehicle body of a motorcycle (straddle vehicle); and a mirror portion including a mirror and provided at a tip end portion of the mirror stay. The mirror stay includes a first stay portion and a second stay portion which branch from the base end portion to extend toward the tip end portion.

4 Claims, 5 Drawing Sheets

66a 62a 66 66a 66 46 62 44 40 62b 64 30b 48b 48a 46 58 66 66a 36a 36 30 54c 54a 54b 58 50 58 54 34a 48c 48 34 30a

(58) Field of Classification Search

CPC ....... B60R 1/0612; B60R 1/0617; B60R 1/07; B60R 1/072; B60R 1/074; G02B 7/18; G02B 7/182; G02B 7/1822; G02B 7/198; G02B 5/08; A47G 1/24

USPC ..... 359/842; 248/900, 475.1, 486, 549, 480, 248/479, 485

See application file for complete search history.

(56) References Cited

U.S. PATENT DOCUMENTS 6,764,056 B1 7/2004 Wu
2009/0244707 A1* 10/2009 Kikuchi .................. B60R 1/088 359/601
2014/0118855 A1* 5/2014 Whinnery ............. G02B 7/198 359/841

FOREIGN PATENT DOCUMENTS

JP 62149576 A 7/1987
JP 2009107562 A 5/2009
JP 2010095244 A 4/2010

OTHER PUBLICATIONS

ISA Japanese Patent Office, International Search Report Issued in Patent Application No. PCT/JP2013/004422, dated Sep. 24, 2013, WIPO, 4 pages.

European Patent Office, Extended European Search Report Issued in Application No. 13861664.4, dated Jul. 25, 2016, Germany, 6 pages.

State Intellectual Property Office of The People's Republic of China, Search Report Issued in Chinese Application No. 2013800638228, dated Mar. 31, 2017, 2 pages.

* cited by examiner

SIDE MIRROR FOR STRADDLE VEHICLE

TECHNICAL FIELD

The present invention relates to a side mirror for a straddle vehicle such as a motorcycle, the side mirror being attached to a vehicle body of the straddle vehicle.

BACKGROUND ART

Examples of a conventional side mirror for a straddle vehicle are disclosed in PTLs 1 and 2. Each of these side mirrors includes: a mirror stay formed in a single rod shape of a metal, such as iron; and a mirror portion attached to a tip end portion of the mirror stay. A base end portion of the mirror stay is attached to a vehicle body. The mirror portion includes a mirror, and a rider can see a rear side of the vehicle body by using the mirror.

CITATION LIST

Patent Literature

PTL 1: Japanese Laid-Open Patent Application Publication No. 2009-107562

PTL 2: Japanese Laid-Open Patent Application Publication No. 2010-95244

SUMMARY OF INVENTION

Technical Problem

According to the conventional side mirror for the straddle vehicle, the mirror stay is formed in a single rod shape. Therefore, the mirror stay easily vibrates, and may become hard to see due to the vibration.

The present invention was made to solve the above problem, and an object of the present invention is to provide a side mirror for a straddle vehicle, the side mirror being capable of suppressing vibration of a mirror stay.

Solution to Problem

In order to solve the above problem, a side mirror for a straddle vehicle according to the present invention includes: a mirror stay including a base end portion attached to a vehicle body of the straddle vehicle; and a mirror portion including a mirror and provided at a tip end portion of the mirror stay, wherein the mirror stay includes a first stay portion and a second stay portion which branch from the base end portion to extend toward the tip end portion.

According to this configuration, since the mirror stay includes the first stay portion and the second stay portion that are two branched parts, the strength of the mirror stay can be increased, and the vibration of the mirror stay can be suppressed.

Advantageous Effects of Invention

According to the present invention, by the above configuration, the vibration of the mirror stay can be suppressed, and a case where it is hard to see the mirror due to the vibration can be prevented.

DESCRIPTION OF EMBODIMENTS

Hereinafter, a preferred embodiment of a side mirror for a straddle vehicle according to the present invention will be explained with reference to the drawings. The side mirror according to the present invention can be used for not only motorcycles as explained in the embodiment below but also straddle-type three-wheeled vehicles, four-wheeled vehicles, and the like. The stated directions are from the perspective of a rider straddling the motorcycle, and a rightward and leftward direction corresponds to a vehicle width direction.

Figure 1:
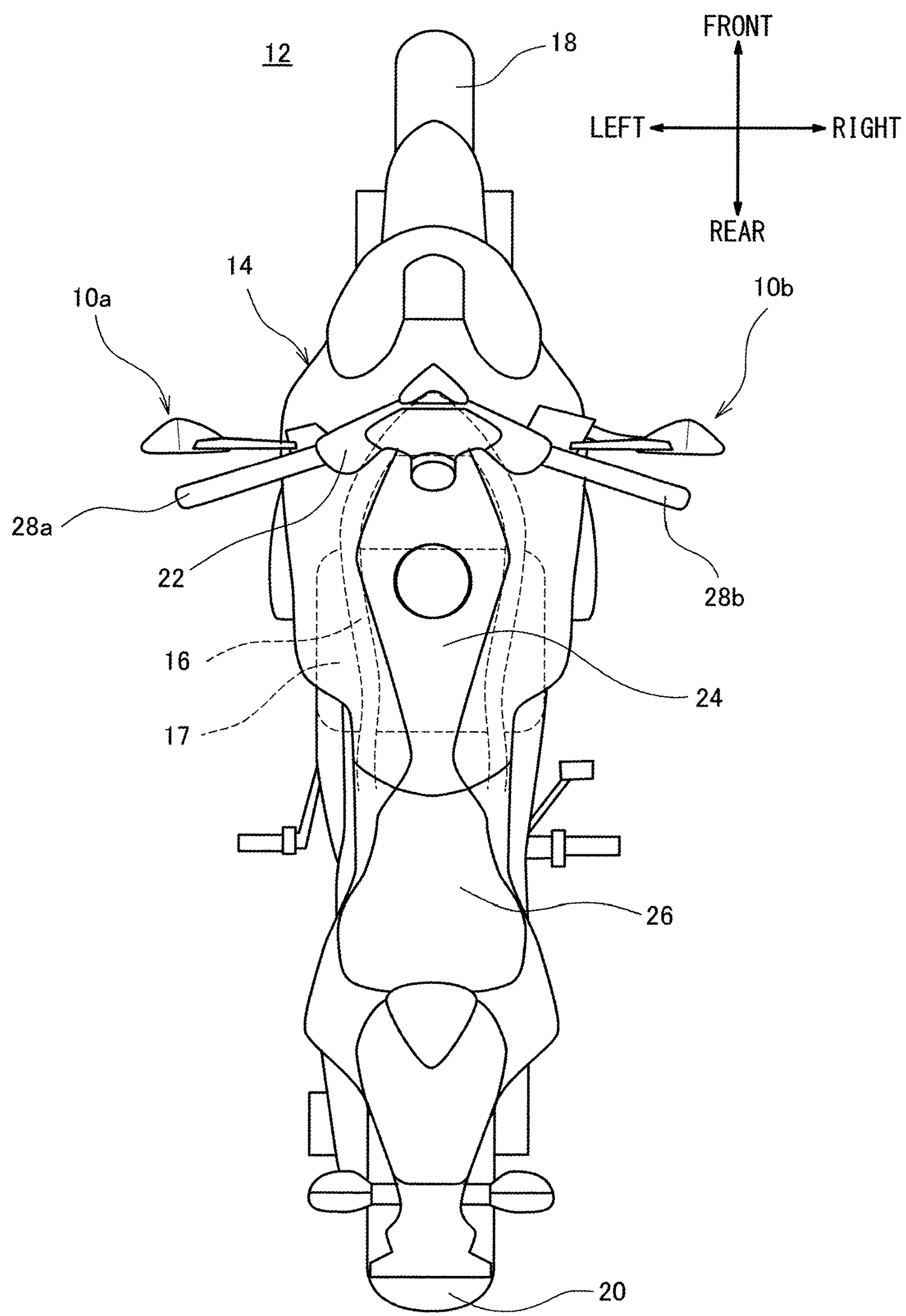
FIG. 1 is a plan view showing the configuration of a motorcycle (straddle vehicle) including side mirrors for the straddle vehicle according to an embodiment.

FIG. 1 is a plan view showing the configuration of a motorcycle 12 including side mirrors 10*a* and 10*b* for a straddle vehicle according to the embodiment. As shown in FIG. 1, the motorcycle 12 includes a vehicle body 14. The side mirrors 10*a* and 10*b* are respectively provided at both vehicle width direction side portions of a front portion of the vehicle body 14. The vehicle body 14 includes a vehicle body frame 16, an engine 17, and a rear wheel 20. The engine 17 mounted on the vehicle body frame 16. The front wheel 18 is located at a front portion of the vehicle body frame 16 to be supported by a front fork (not shown). The rear wheel 20 is located at a rear portion of the vehicle body frame 16 to be supported by a swing arm (not shown). The vehicle body 14 further includes a steering handle 22, a fuel tank 24, and a seat 26. The steering handle 22 is swung to the left or right by a rider to steer the front wheel 18. The fuel tank 24 is arranged behind the steering handle 22. The seat 26 is arranged behind the fuel tank 24. The steering handle 22 is provided with two grips 28*a* and 28*b* held by the rider.

As shown in FIG. 1, the side mirrors 10*a* and 10*b* are respectively attached to portions located in the vicinities of base end portions of the grips 28*a* and 28*b* of the steering handle 22. The rider straddling the seat 26 can see the rear side by the side mirrors 10*a* and 10*b*. The side mirrors 10*a* and 10*b* are formed symmetrically in the rightward and leftward direction. Therefore, the following will focus on the side mirror 10*a* at the left side and explain the configuration of the side mirror 10*a*.

Figure 2:
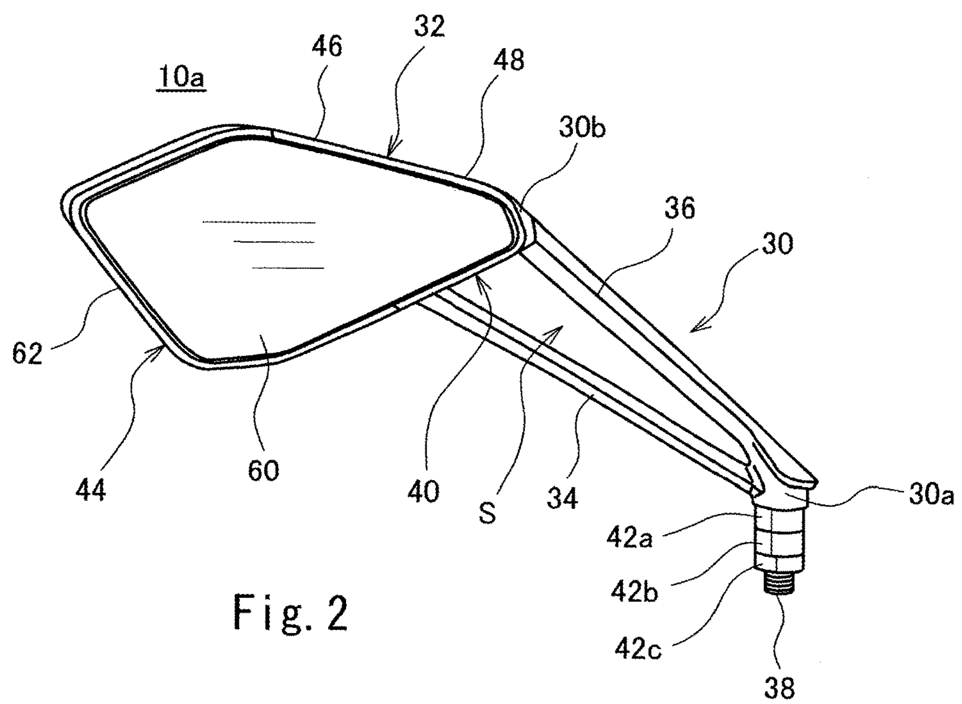
FIG. 2 is a front view showing the configuration of the side mirror for the straddle vehicle according to the embodiment.
Figure 3:
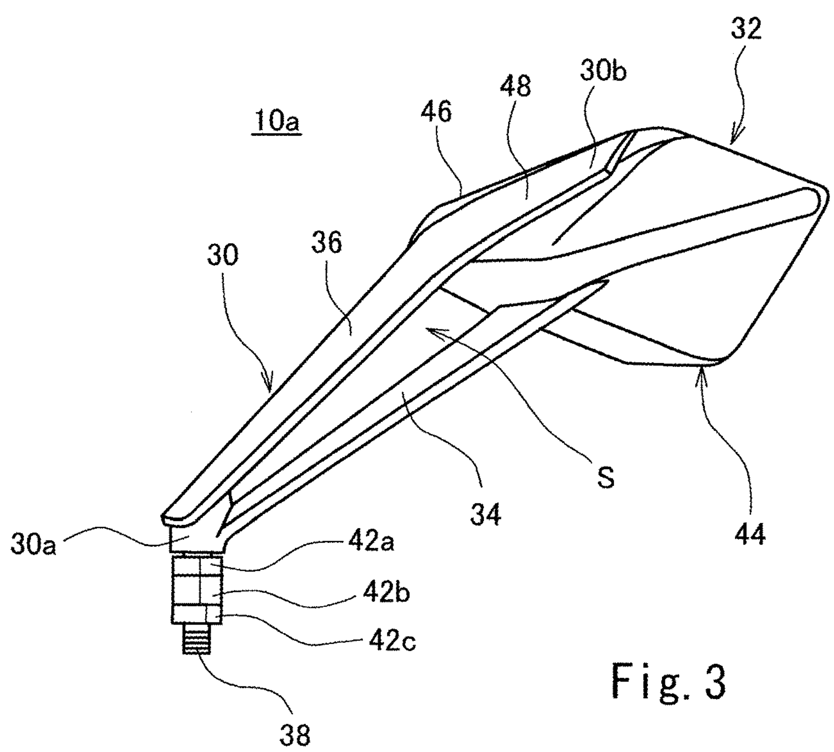
FIG. 3 is a rear view showing the configuration of the side mirror for the straddle vehicle according to the embodiment.

FIG. 2 is a front view showing the configuration of the side mirror 10*a* for the straddle vehicle according to the embodiment. FIG. 3 is a rear view showing the configuration of the side mirror 10*a*. As shown in FIGS. 2 and 3, the side mirror 10*a* includes a mirror stay 30 and a mirror portion 32. The mirror stay 30 includes a base end portion 30*a* attached to the vehicle body 14 (FIG. 1). The mirror portion 32 is provided at a tip end portion 30*b* of the mirror stay 30.

As shown in FIGS. 2 and 3, the mirror stay 30 includes a first stay portion 34, a second stay portion 36, a bolt 38, and a coupling portion 40. Each of the first stay portion 34 and the second stay portion 36 branches from the base end portion 30a to extend toward the tip end portion 30b. The bolt 38 is provided at the base end portion 30a. The coupling portion 40 is located at the tip end portion 30b to couple the first stay portion 34 and the second stay portion 36. The first stay portion 34 and the second stay portion 36 are arranged so as to be spaced apart from each other in an upper/lower direction, and a space S through which air flows is formed between the first stay portion 34 and the second stay portion 36. A double nut method is adopted when attaching the mirror stay 30 to the steering handle 22. Nuts 42a, 42b, and 42c are threadedly engaged with the bolt 38 by a predetermined procedure.

Figure 4:
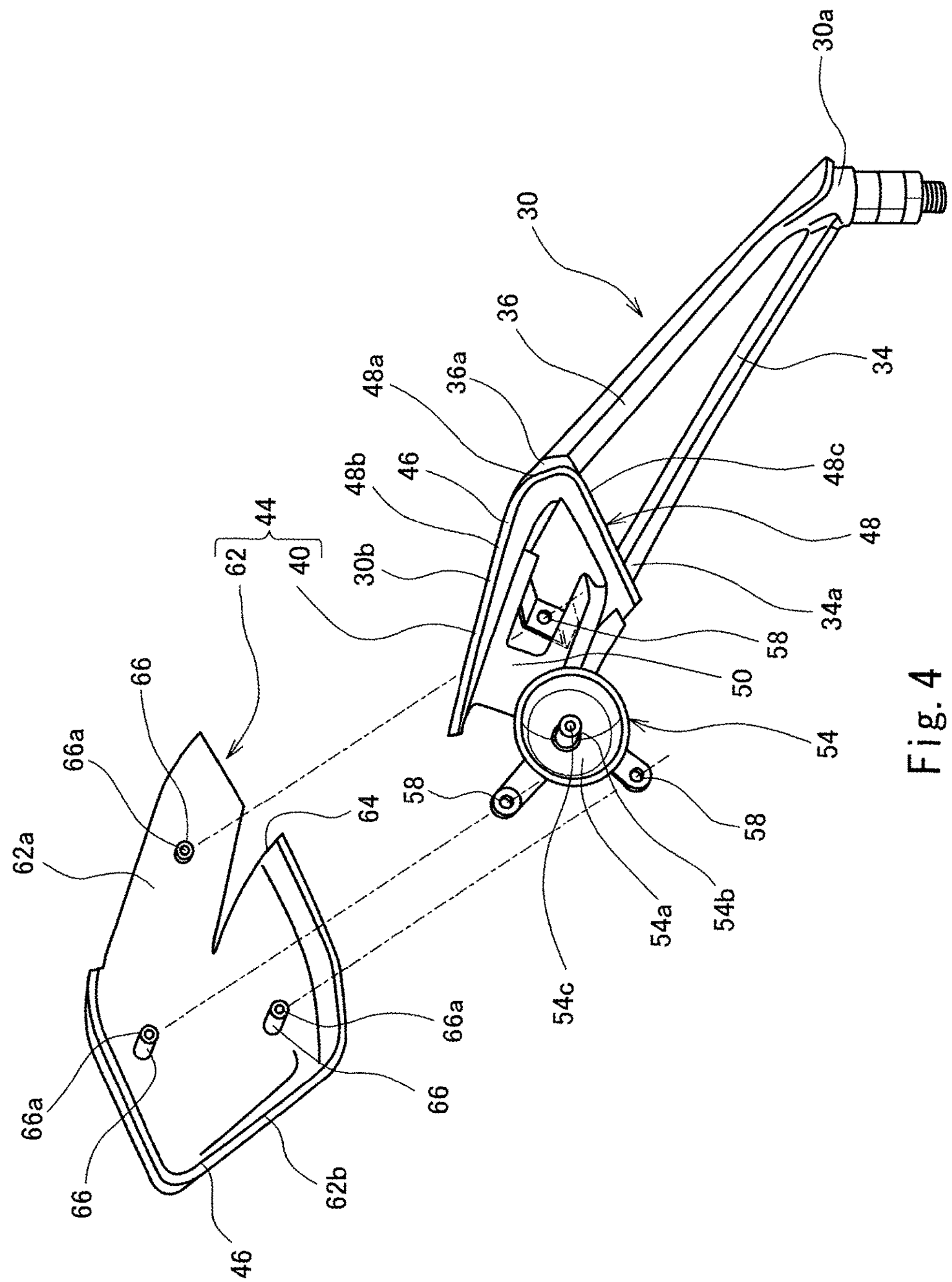
FIG. 4 is a perspective view showing the configurations of a mirror stay and a mirror housing.

FIG. 4 is a perspective view showing the configurations of the mirror stay 30 and a mirror housing 44. As shown in FIG. 4, the coupling portion 40 of the mirror stay 30 includes a wall portion 48 and a coupling plate portion 50. The wall portion 48 constitutes a part of a peripheral wall 46 of the mirror housing 44. The coupling plate portion 50 is formed so as to extend from a rear surface side end edge of the wall portion 48 to an inside of the mirror housing 44. The wall portion 48 includes a bent portion 48a, an upper wall portion 48b, and a lower wall portion 48c. The bent portion 48a is formed at a tip end portion 36a of the second stay portion 36. The upper wall portion 48b is formed so as to extend from the bent portion 48a toward an upper left side. The lower wall portion 48c is formed so as to extend from the bent portion 48a toward a lower left side. The lower wall portion 48c extends between the tip end portion 36a of the second stay portion 36 and a tip end portion 34a of the first stay portion 34. The first stay portion 34 and the second stay portion 36 are coupled to each other by the lower wall portion 48c.

As shown in FIG. 4, the coupling plate portion 50 is a portion of the coupling portion 40 which is arranged inside the mirror housing 44. The coupling plate portion 50 is formed in a plate shape so as to couple a rear surface side end edge of a tip end portion of the upper wall portion 48b and a rear surface side end edge of a tip end portion of the lower wall portion 48c. A mirror supporting portion 54 which supports a mirror 60 and a mirror supporting plate 68 is formed at a portion of the coupling plate portion 50 which is located at a middle portion of the mirror housing 44. With this, the mirror supporting portion 54 is arranged at the middle portion of the mirror housing 44. A plurality of (in the present embodiment, three) holes 58 into which bolts 56 (FIG. 5) are inserted are formed at a portion of the coupling plate portion 50 which is located around the mirror supporting portion 54. The mirror supporting portion 54 includes a semi-spherical recess 54a in which a semi-spherical projection 72 formed at the mirror supporting plate 68 is slidably fitted. A post 54b is formed at a bottom portion of the recess 54a, and an internal screw 54c is formed on a tip end surface of the post 54b.

Referring again to FIGS. 2 and 3, the mirror portion 32 includes the mirror 60 and at least a part of the mirror housing 44 which accommodates the mirror 60. The mirror 60 is formed in a plate shape and also in a shape substantially the same as the shape of an opening portion of the mirror housing 44. The mirror housing 44 includes: the coupling portion 40 (including the wall portion 48) formed integrally with the mirror stay 30; and a housing constituting member 62 formed separately from the mirror stay 30. In the present embodiment, the entire mirror stay 30 is made of metal, and the entire housing constituting member 62 is made of synthetic resin. Therefore, regarding the mirror housing 44, a tip end portion formed by the housing constituting member 62 is lighter than a base end portion formed by the coupling portion 40 of the mirror stay 30. When producing the mirror stay 30, it is desirable to use aluminum die-casting, which makes it possible to produce the mirror stay 30 which has a complex shape with an excellent design to be light.

As shown in FIG. 4, the housing constituting member 62 includes a bottom plate portion 62a and a wall portion 62b. The bottom plate portion 62a constitutes a rear surface of the mirror housing 44. The wall portion 62b constitutes a part of the peripheral wall 46 of the mirror housing 44. A cutout portion 64 in which a part of the mirror stay 30 is fitted is formed at a part of a peripheral portion of the bottom plate portion 62a. A plurality of internal screw portions 66 are formed on an inner surface of the bottom plate portion 62a. The plurality of internal screw portions 66 respectively include internal screws 66a corresponding to the holes 58 formed on the mirror stay 30. When attaching the housing constituting member 62 to the mirror stay 30, the plurality of internal screws 66a of the housing constituting member 62 are positioned relative to the corresponding holes 58 of the mirror stay 30. Then, the bolts 56 (FIG. 5) are respectively inserted through the plurality of holes 58 to be threadedly engaged with the plurality of internal screws 66a.

Figure 5:
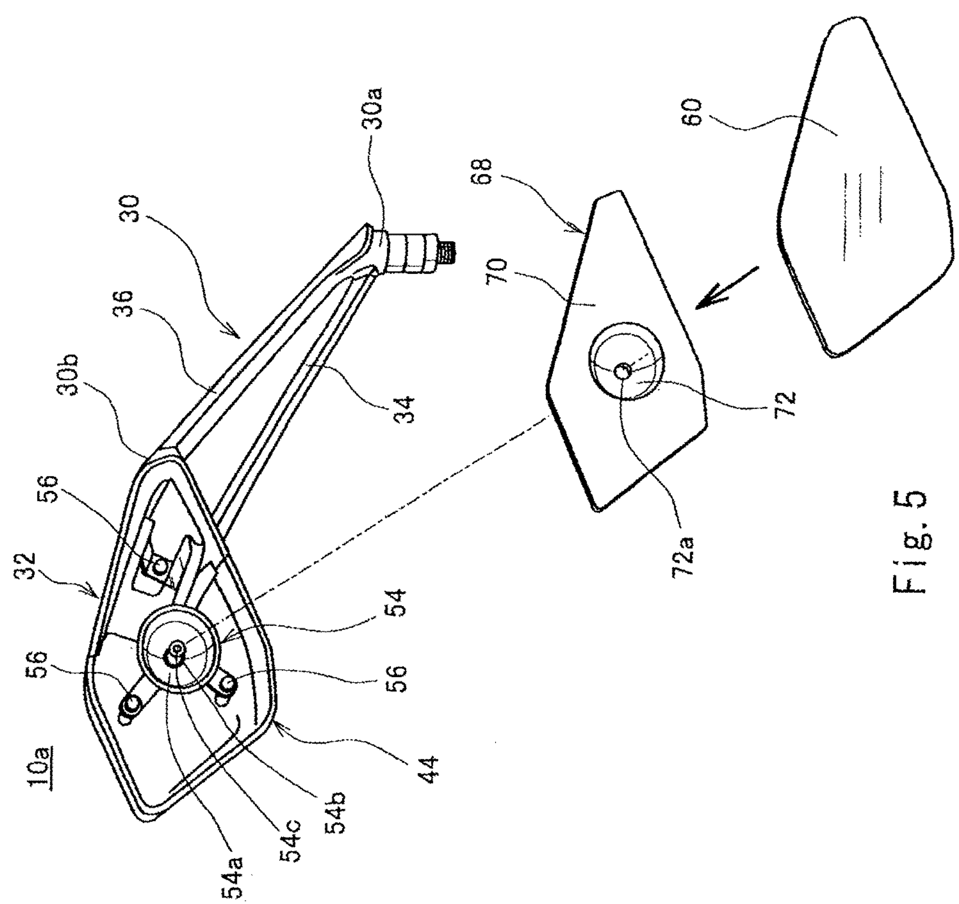
FIG. 5 is a perspective view showing the configurations of the mirror stay, the mirror housing, a mirror supporting plate, and a mirror.

FIG. 5 is a perspective view showing the configurations of the mirror stay 30, the mirror housing 44, the mirror supporting plate 68, and the mirror 60. As shown in FIG. 5, the mirror portion 32 further includes the mirror supporting plate 68. The mirror supporting plate 68 includes a plate-shaped mirror joint portion 70 to which the mirror 60 is joined via a joining material (not shown), such as a double-sided adhesive sheet. The mirror joint portion 70 is formed smaller than the mirror 60 so as not to protrude from an outer peripheral edge of the mirror 60. The substantially semi-spherical projection 72 is formed at a middle portion of the mirror joint portion 70 so as to project toward the rear surface side. A hole 72a through which the post 54b of the mirror supporting portion 54 is inserted is formed at a bottom portion of the projection 72. An inner diameter of the hole 72a is set to be adequately larger than an outer diameter of the post 54b.

Figure 6:
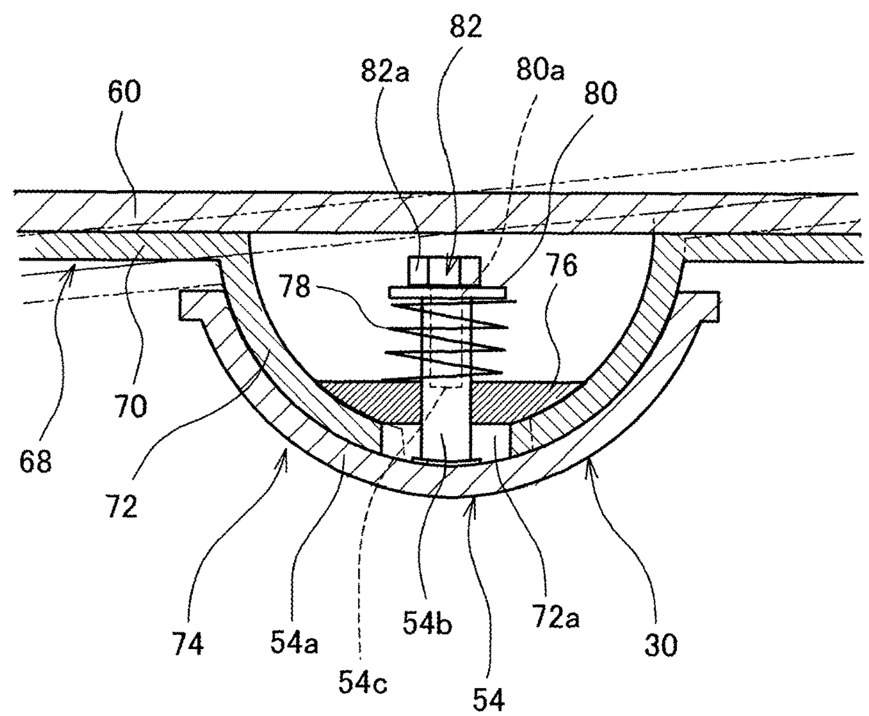
FIG. 6 is a cross-sectional view showing an attaching structure by which the mirror supporting plate and the mirror are attached to the mirror stay.

FIG. 6 is a cross-sectional view showing an attaching structure 74 by which the mirror supporting plate 68 and the mirror 60 are attached to the mirror stay 30. As shown in FIG. 6, the attaching structure 74 includes: the mirror supporting portion 54 provided at the mirror stay 30; the mirror supporting plate 68; a retainer 76; a coil spring 78; a spring stopper member 80; and a bolt 82. The retainer 76 is arranged at a rear surface side of the projection 72 provided at the mirror supporting plate 68. The coil spring 78 is arranged around the post 54b in a compressed state such that one end portion of the coil spring 78 pushes the retainer 76 toward the rear surface of the projection 72. The spring stopper member 80 is a plate-shaped member which locks the other end portion of the coil spring 78. The spring stopper member 80 is arranged at a tip end portion of the post 54b. A hole 80a through which the bolt 82 is inserted is formed at a middle portion of the spring stopper member 80. The bolt 82 is inserted through the hole 80a and threadedly engaged with the internal screw 54c of the post 54b such that a head portion 82a of the bolt 82 locks the spring stopper member 80. The inner diameter of the hole 72a formed at the projection 72 is set to be adequately larger than the outer diameter of the post 54b inserted through the hole 72a. Therefore, the projection 72 can be rotated relative to the recess 54a in all directions, so that a support angle of the mirror supporting plate 68 and the mirror 60 can be suitably adjusted. A chain double-dashed line in FIG. 6 shows a state where the support angle of the mirror supporting plate 68 and the mirror 60 is changed.

According to the present embodiment, the following effects can be obtained by the above configuration. To be specific, as shown in FIG. 2, since the mirror stay 30 includes the first stay portion 34 and the second stay portion 36 that are two branched parts, the strength of the mirror stay 30 can be increased, and the vibration of the mirror stay 30 can be suppressed. With this, a case where it is hard to see the mirror 60 due to the vibration can be prevented.

As shown in FIG. 2, the space S is formed between the first stay portion 34 and the second stay portion 36. Therefore, when the motorcycle 12 (FIG. 1) travels, wind can flow through the space S, so that air resistance can be reduced.

As shown in FIG. 4, since the first stay portion 34 and the second stay portion 36 are coupled to each other by the coupling portion 40, the strength of the mirror stay 30 can be increased. Since the mirror supporting portion 54 is formed at the coupling portion 40 that is a part of the mirror stay 30, the mirror supporting portion 54 hardly vibrates.

As shown in FIG. 5, the mirror supporting portion 54 arranged at the middle portion of the mirror housing 44 can support a middle portion of the mirror 60 and a middle portion of the mirror supporting plate 68 from the rear surface side. Therefore, the vibration of the mirror 60 can be made smaller than in a case where the mirror supporting portion 54 supports an end portion of the mirror 60 and an end portion of the mirror supporting plate 68. Since the mirror supporting portion 54 is configured such that the support angle of the mirror 60 is changeable, the direction of the mirror 60 can be adjusted such that the rider can easily see the mirror 60.

As shown in FIG. 4, since a part of the mirror housing 44 is constituted by a part (the coupling portion 40) of the mirror stay 30 which is made of metal, the strength of the mirror housing 44 can be increased. In addition, since a portion (the housing constituting member 62) of the mirror housing 44 which is located at a front side of a portion of the mirror housing 44 which is constituted by a part (the coupling portion 40) of the mirror stay 30 is made of synthetic resin, the mirror housing 44 can be reduced in weight while increasing the strength of the mirror housing 44. Therefore, the operability of the steering handle 22 to which the side mirrors 10*a* and 10*b* are attached can be prevented from being impaired.

As shown in FIG. 2, in the above embodiment, the first stay portion 34 and the second stay portion 36 are coupled to each other at two portions that are the base end portion 30*a* and the tip end portion 30*b*. However, the first stay portion 34 and the second stay portion 36 may be further coupled to each other at one or more portions located between the base end portion 30*a* and the tip end portion 30*b*. In this case, a coupling portion (not shown) which couples the first stay portion 34 and the second stay portion 36 may be arranged in the space S.

As shown in FIG. 1, in the above embodiment, the side mirrors 10*a* and 10*b* are attached to the steering handle 22 of the vehicle body 14. However, the side mirrors 10*a* and 10*b* may be attached to other portions (for example, a front cowl) of the vehicle body 14.

Figure 7:
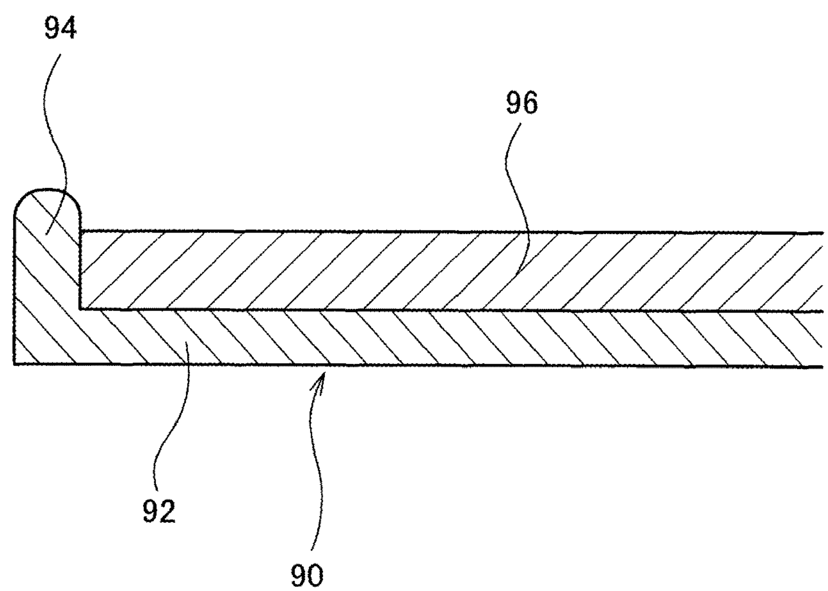
FIG. 7 is a partial cross-sectional view showing the mirror supporting plate according to a Modified Example.

FIG. 7 is a partial cross-sectional view showing a mirror supporting plate 90 according to a Modified Example. The mirror supporting plate 90 shown in FIG. 7 is provided with a protrusion 94 made of synthetic resin. The protrusion 94 is formed at an outer peripheral portion of a mirror joint portion 92 made of synthetic resin. The protrusion 94 covers an outer peripheral edge of a mirror 96. Therefore, the outer peripheral edge of the mirror 96 does not contact the mirror housing 44, so that the mirror housing 44 can be prevented from being damaged.

REFERENCE CHARACTER LIST

10*a*, 10*b* side mirror for straddle vehicle
12 motorcycle (straddle vehicle)
14 vehicle body
30 mirror stay
30*a* base end portion
30*b* tip end portion
32 mirror portion
34 first stay portion
36 second stay portion
60 mirror

The invention claimed is:

1. A side mirror for a straddle vehicle, the side mirror comprising:

a mirror stay including a base end portion that is configured to be attached to a vehicle body of the straddle vehicle, the mirror stay being made of metal; and a mirror portion including a mirror housing which accommodates a mirror and provided at a tip end portion of the mirror stay, wherein:

the mirror stay includes:

a first stay portion and a second stay portion which branch from the base end portion to extend toward the tip end portion of the mirror stay;

a coupling portion formed integrally with the tip end portion of the mirror stay to couple the first stay portion and the second stay portion; and a mirror supporting portion supporting the mirror;

the mirror housing includes the coupling portion of the mirror stay and a housing constituting member formed separately from the mirror stay, the housing constituting member being made of synthetic resin;

the mirror supporting portion is formed at the coupling portion;

the coupling portion includes a first wall portion that constitutes a part of a peripheral wall of the mirror housing;

the housing constituting member includes a second wall portion that constitutes a remaining part of the peripheral wall of the mirror housing;

a base end portion of the mirror housing is formed by the coupling portion of the mirror stay, the base end portion being located at a first side closer to the first stay portion and the second stay portion; and a tip end portion of the mirror housing is formed by the housing constituting member, the tip end portion of the mirror housing being located at a second side opposite to the first side closer to the first stay portion and the second stay portion.

2. The side mirror according to claim 1, wherein a space through which air flows is formed between the first stay portion and the second stay portion.

3. The side mirror according to claim 1, wherein the mirror supporting portion is arranged at a middle portion of the mirror housing so as to support the mirror from a rear surface side of the mirror.

4. The side mirror according to claim 3, wherein the mirror supporting portion is configured such that a support angle of the mirror is changeable.

* * * * *